(No Model.)
B. BRONSON.
ROSETTE MACHINE.
No. 426,105. Patented Apr. 22, 1890.
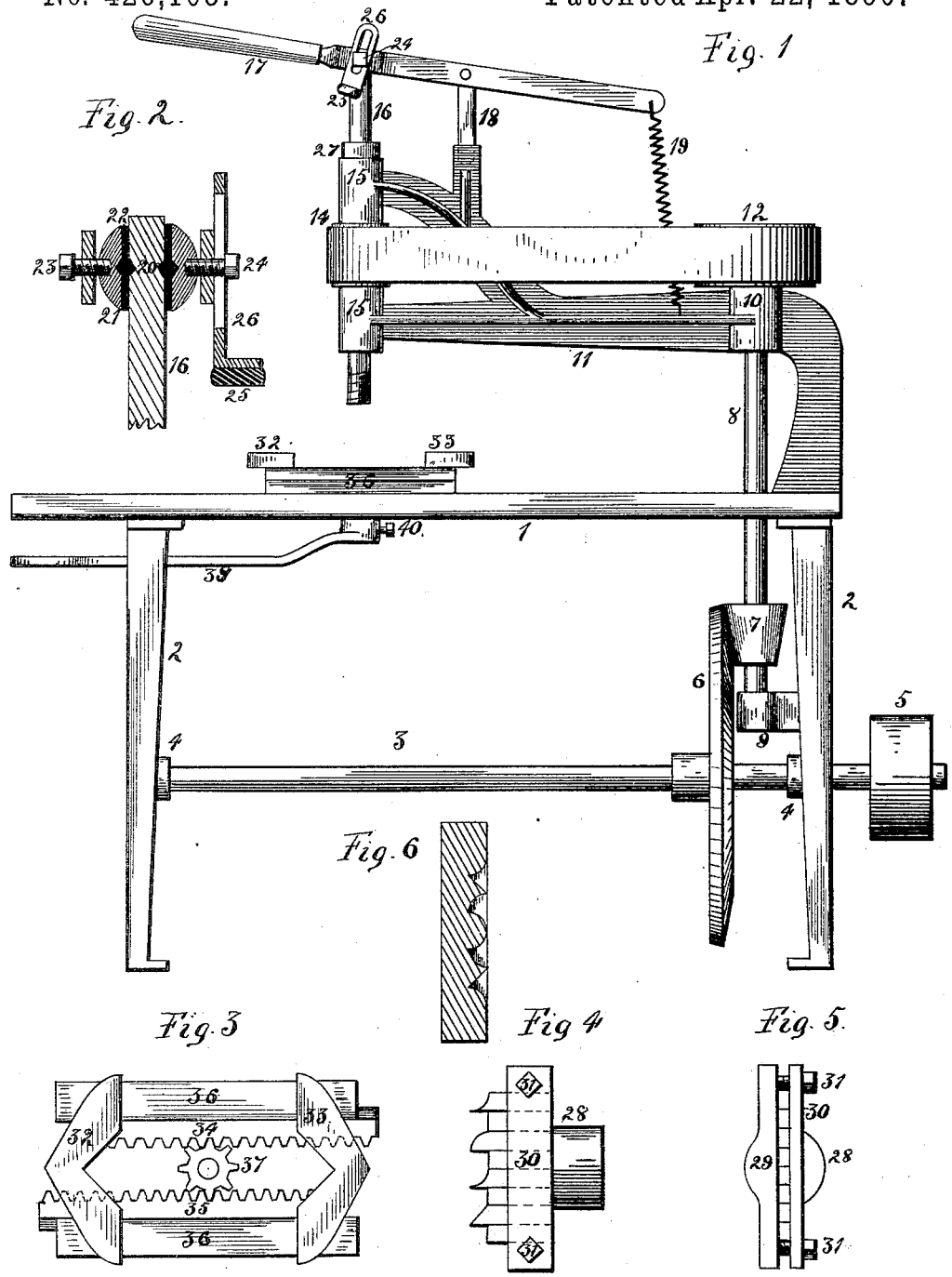
Witnesses:
Guy P. Cobb
E. Behel.
Inventor:
Benjamin Bronson
By A. O. Behel
Atty.

UNITED STATES PATENT OFFICE.

BENJAMIN BRONSON, OF BELOIT, WISCONSIN, ASSIGNOR OF TWO-THIRDS TO THOMAS PURVES AND ERNEST LIPMAN, BOTH OF SAME PLACE.

ROSETTE-MACHINE.

SPECIFICATION forming part of Letters Patent No. 426,105, dated April 22, 1890.

Application filed November 5, 1889. Serial No. 329,282. (No model.)

*To all whom it may concern:*

Be it known that I, BENJAMIN BRONSON, a citizen of the United States, residing at Beloit, in the county of Rock and State of Wisconsin, have invented certain new and useful Improvements in Rosette-Machines, of which the following is a specification.

The object of this invention is to construct a machine for cutting rosettes for ornamentation, more especially for interior house finish.

In the accompanying drawings, Figure 1 is a side elevation of a machine embodying my invention. Fig. 2 is a vertical central section of the upper end of the revolving spindle. Fig. 3 is a plan view of the gage employed to clamp the material to be operated upon. Fig. 4 is a side elevation of the sectional cutter employed to cut the rosettes. Fig. 5 is a face view of the cutter. Fig. 6 is a sectional view of a rosette cut with the cutter represented at Figs. 4 and 5.

The table 1 of the machine is supported upon legs 2, secured to its under side in any suitable manner. A horizontal shaft 3 is supported to revolve in bearings 4. One end of this shaft extends rearward beyond the framework, and a driving-pulley 5 is mounted thereon. A frictional bevel-wheel 6 is secured to this shaft and its face revolves in contact with a small bevel friction-wheel 7, secured to the lower end of a vertical shaft 8, which has a bearing 9 for its lower end. This shaft extends up through the table and its upper end is guided in a bearing 10, formed in an overhanging arm 11, secured to the top of the table. A pulley 12 is secured to the upper end of the shaft, and a belt 13 connects this pulley with a second pulley 14, held between two bearings 15, which have a connection with the overhanging arm 11. A vertical spindle 16 has a feather-connection with the second pulley 14, so as to permit a vertical movement of the spindle independent of its rotary movement. The lower end of this spindle is screw-threaded for the purpose of receiving a tool for turning rosettes.

A lever 17 has a pivotal connection with the overhanging arms through a swinging fulcrum 18, and a spring 19 has a connection with its rear end. This lever is connected with the upper end of the spindle in such a manner as to permit its rotary movement and by means of which the spindle is depressed, as desired, for the purpose of turning a rosette. The connection of this lever with the spindle is shown at Fig. 2. An annular groove 20 is turned in the spindle and a spherical block 21 is held thereto by Babbitt metal 22 being run between the parts, as shown. This block is held within an opening in the lever by set-screws 23 and 24, screw-threaded through the lever and entering the sockets in the block. A rubber cushion 25 is connected with an adjustable bracket 26, held in position by the set-screw 24. When the spindle is depressed, this rubber cushion will come in contact with a collar 27, placed loosely on the spindle, thereby limiting its descent.

In Figs. 4 and 5 I have shown a cutter such as I prefer to use in manufacturing rosettes, and which consists of a screw-threaded socket 28 and plate 29, which is screw-threaded near its ends. A series of knives is placed side by side on the plate 29, and are thus held by a strap 30 and screw-bolt 31, which are turned up until the knives are firmly clamped between the parts. The knives are made interchangeable, so that a few knives will, when properly combined, produce a great variety of rosettes. At Fig. 6 is shown in section a rosette such as would be made with the combination of knives shown. In cutting rosettes on a block or strip it is necessary that a clamp should be employed to properly hold and center the material. Therefore I have constructed the clamp shown at Fig. 3, which consists of two jaws 32 and 33. The jaw 32 has a tooth-rack 34 extending at right angles to its face, and the jaw 33 has a similar rack 35. These racks have their outer edge beveled and move in guideways 36. A toothed wheel 37 is so placed between these racks that its teeth will mesh with the teeth of both racks on opposite sides. A spindle connected with the wheel depends through the table, and to which is connected a lever 39 for oscillating the wheel. The lever is connected to the wheel by a set-screw 40. By loosening the set-screw 40 the toothed wheel may be rotated in either direction until the jaws of the clamp are brought the right distance apart, when the lever will be connected. By moving the wheel with the lever the racks are made to move in opposite directions, according to the movement of the lever. When the work has been placed in position, the jaws are brought toward each other to firmly clamp the work to be operated upon. The faces of the jaws are notched for the purpose of holding square blocks and properly centering them. When it is desired to cut rosettes on doors or larger pieces of material than can be held by the clamp, the clamp can be removed, thus leaving the flat surfaces of the table.

By this construction of a machine I am able to cut rosettes so that they will be complete when they come from the machine. I accomplish this by the very high velocity attained by the friction driving mechanism.

I claim as my invention—

1. In a rosette-machine, the combination of a horizontal table, an overhanging arm, a spindle supported by the arm, a pulley having a splined connection with the spindle, a vertical driving-shaft having a pulley on its upper end, a belt connecting said pulley with the pulley of the spindle, a horizontal shaft having a bevel friction-wheel connection with the driving-shaft, a lever having a connection with the spindle for imparting a vertical movement thereto, and a stop to limit the descent of the spindle, substantially as set forth.

2. In a rosette-machine, the combination of a horizontal table, an overhanging arm, a spindle supported by the arm, a lever for lowering the spindle, a spring for raising the spindle, a yielding stop for the spindle, and beveled friction-wheels for driving the spindle, substantially as set forth.

BENJAMIN BRONSON.

Witnesses:
W. S. KENDALL,
F. N. PERRY.